July 2, 1957  F. A. SHERMAN  2,797,733
ADJUSTABLE SEAT STRUCTURE
Filed April 19, 1954  2 Sheets-Sheet 1
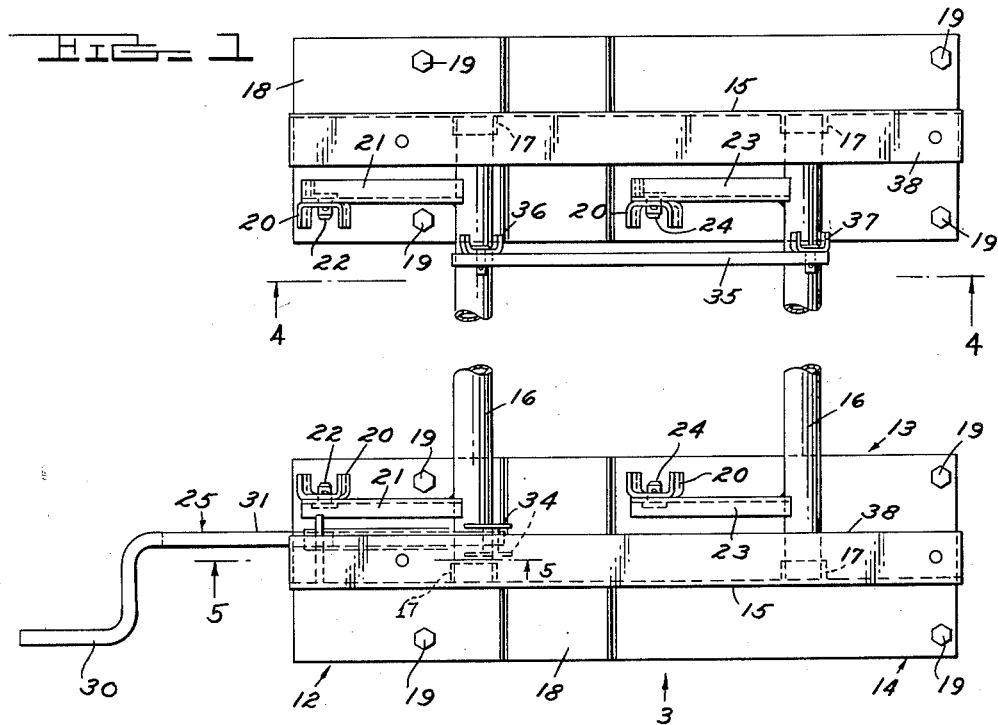
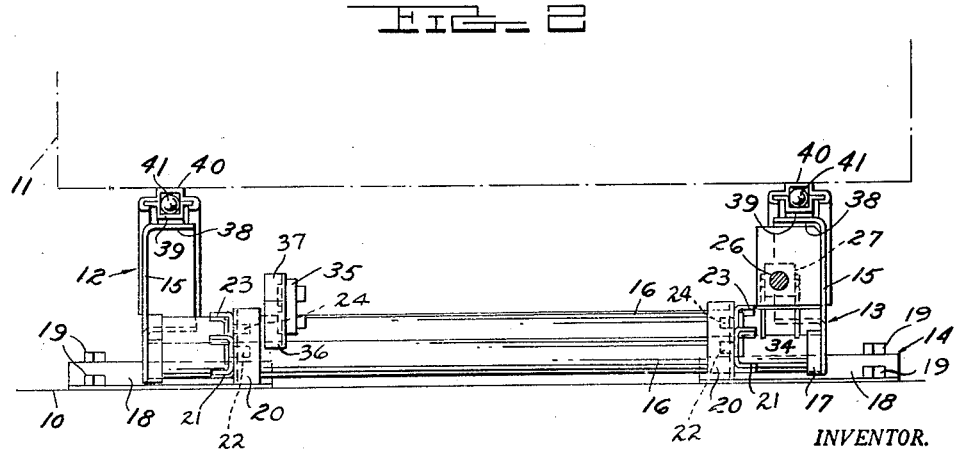
INVENTOR.
FLOYD A. SHERMAN
BY
ATTORNEYS

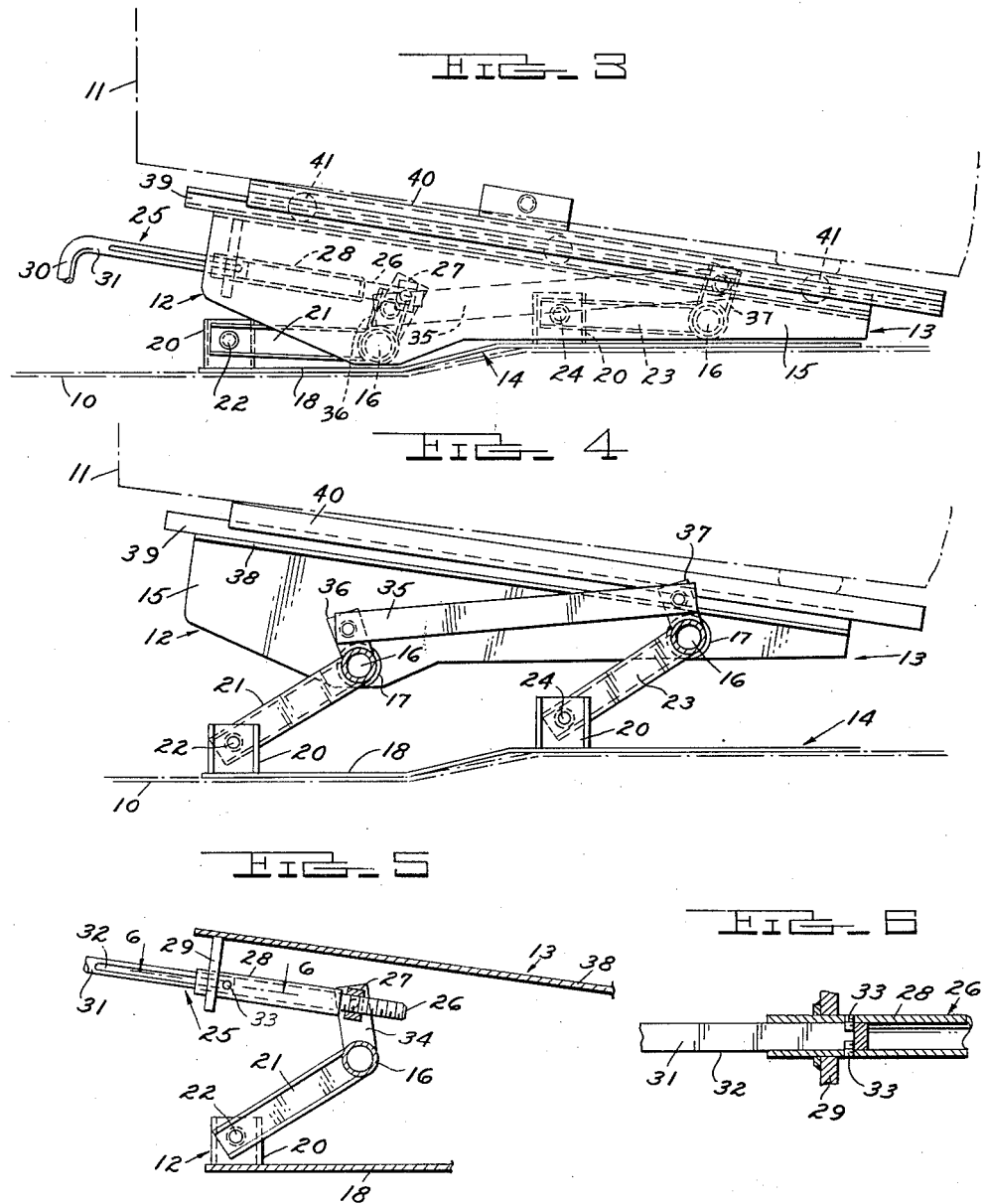

United States Patent Office 2,797,733
Patented July 2, 1957

2,797,733

ADJUSTABLE SEAT STRUCTURE

Floyd A. Sherman, Birmingham, Mich., assignor to Motor Products Corporation, Detroit, Mich., a corporation of New York Application April 19, 1954, Serial No. 423,915

4 Claims. (Cl. 155—14)

This invention relates generally to seats for vehicle bodies and refers more particularly to improvements in adjustable seat constructions.

It is an object of this invention to provide relatively simple mechanism capable of being installed in a compact space and rendering it possible to firmly support a vehicle body seat at various preselected elevations relative to the flooring of the vehicle body.

It is another object of this invention to provide adjusting mechanism rendering it possible to vary the elevation of a vehicle body seat throughout a relatively wide range and capable of being readily installed in connection with seats embodying the usual fore and aft adjustment without altering the means for accomplishing the latter adjustment.

The foregoing as well as other objects will be made more apparent as this description proceeds especially when considered in connection with the accompanying drawings, wherein Figure 1 is a fragmentary top plan view of a vehicle body seat adjusting mechanism embodying the features of this invention;

Figure 2 is a front elevational view of the construction shown in Figure 1 having certain parts broken away for the sake of clearness;

Figure 3 is a side elevational view of the seat adjusting mechanism shown in Figure 1;

Figure 4 is a sectional view taken substantially on the line 4—4 of Figure 1;

Figure 5 is a sectional view taken on the line 5—5 of Figure 1, and

Figure 6 is a sectional view taken on the line 6—6 of Figure 5.

In Figures 2, 3 and 4 of the drawings, the numeral 10 designates a floor pan of a vehicle body and the numeral 11 indicates a seat structure which may be any one of the various accepted designs. The seat structure 11 is supported in an elevated position with respect to the floor pan 10 by an assembly 12 forming the subject matter of the present invention and is located beneath the seat 11.

The assembly 12 comprises a frame structure 13 and a support 14 for the frame structure. The frame structure 13 comprises a pair of laterally spaced elongated members in the form of vertical plates 15 and cross braces in the form of tubes 16 extending between the plates 15 in spaced relationship lengthwise of the plates 15. The opposite ends of the tubes 16 are journaled in bearings 17 respectively secured to the plates in a manner such that the tubes 16 rotate relative to the plates 15 about parallel axes.

The support 14 comprises laterally spaced base plates 18 fashioned to correspond to the contour of the floor pan 10 and secured to the floor pan by fastener elements 19. The base plates 18 are respectively located directly below the plates 15 and each base plate 18 has a pair of brackets 20 secured to the top surface thereof in spaced relationship lengthwise of the support 14. As shown in Figure 4 of the drawings, the rear brackets 20 are offset in a forward direction with respect to the rear tube 16 and the front brackets 20 are offset forwardly with respect to the front tube 16. However, the location of the brackets 20 is such that the latter assume positions between the plates 15 and, hence, do not interfere with vertical travel of the frame structure 13.

The tube 16 at the front of the frame structure 13 is connected to the forwardmost brackets 20 by a pair of arms 21 having the rear ends welded or otherwise secured to the front tube 16 in spaced relationship lengthwise of the latter tube and having the front ends respectively pivoted to the forwardmost brackets 20 by pins 22. The axes of the pins 22 are in alignment and extend substantially parallel to the axis of rotation of the front tube 16.

The tube 16 at the rear of the frame structure 13 is connected to the rearwardmost brackets 20 by a pair of arms 23 having the rear ends welded or otherwise secured to the rearwardmost tube 16 in spaced relationship axially of the latter tube and having the front ends respectively pivotally connected to the rearwardmost brackets 20 by pins 24. The pins 24 are in axial alignment and extend substantially parallel to the axis of the rear tube 16. It follows from the above that the axes of the pivot pins 22 and 24 and the axes of the tubes 16 are in parallel relationship. It will also be noted from Figure 4 of the drawings that the aligned axes of the pivot pins 22 are spaced from the aligned axes of the pivot pins 24 a distance substantially equal to the distance between the axes of the tubes 16 so that the pairs of arms 21, 23 provide in effect a parallelogram rendering it possible to move the frame 13 vertically without tipping the seat 11.

The frame structure 13 is raised and lowered with respect to the support 14 by mechanism indicated generally in the drawings by the numeral 25. The mechanism 25 comprises essentially a screw 26 and a nut 27. As shown in Figure 5 of the drawings, the screw 26 extends at right angles to the forwardmost tube 16 above the latter and has a tubular part 28 at the front end thereof. The tubular part 28 is supported at its front end in a bracket 29 which in turn is fastened to one of the plates 15 of the frame structure 13, and a handle 30 has a shank 31 operatively connected to the tubular part 28. The handle 30 is accessible for manipulation at the front of the seat 11, and the shank 31 telescopes within the tube 28. It will be noted from Figure 6 of the drawings that the shank 31 is fashioned with an elongated slot 32, and that set screws 33 are secured to the tubular part 28 in positions to project into the slot 32. This arrangement enables rotation of the screw 26 by the handle 30 and permits the handle to be shifted rearwardly relative to the tubular part 28 to a position where it is out of the way when not in use.

Projecting upwardly from the forwardmost tube 16 and secured to the latter is a bracket 34. The bracket 34 is bifurcated to receive the nut 27 and the latter is pivoted to the bracket 34 for rotation about an axis extending parallel to the axis of the forwardmost tube 16. The nut 27 threadably receives the screw 26 so that rotation of the screw by the handle 30 imparts a swinging movement to the pair of arms 21 about the aligned axes of the pins 22 in a direction depending on the direction of rotation of the screw 26. During swinging movement of the pair of arms 21, the tube 16 to which these arms are secured rotates slightly and this rotation is permitted by the rocking movement of the nut 27. Of course, swinging movement of the pair of arms 21 in an upward direction from the position shown in Figure 3 of the drawings raises the front of the frame 13 and swinging movement of the arms 21 in a downward direction lowers the front end of the frame 13.

In order to impart a corresponding movement to the rear of the frame 13 the two tubes 16 are connected together by a link 35 having the front end pivoted to a bracket 36, projecting upwardly from and secured to the front tube 16 and having the rear end pivoted to a bracket 37 extending upwardly from and secured to the rear tube 16. Thus, the operating force applied to the pair of arms 21 is transmitted to the rear pair of arms 23 and, due to the parallelogram arrangement previously described, the frame structure 13 is moved vertically without tipping the seat 11.

The top edges of the plates 15 are turned laterally inwardly to provide flanges 38 extending for the full length of the plates 15. Suitably secured to the top surface of each flange 38 is a guide 39 which extends lengthwise of the adjacent flange 38 and slidably engages a cooperating guide 40. These guides are preferably of conventional design and cooperate with one another to provide a channel for the usual balls 41 which enable relatively free fore and aft sliding movement of the guides 40 relative to the guides 39. In practice, the guides 40 are secured to the base frame structure (not shown) of the seat 11. The mechanism enabling movement of the seat guides 40 relative to the supporting guides 39 in a fore and aft direction forms no part of the present invention, and hence is not shown herein.

It will be apparent from the above that the plates 15 of the vertically movable frame structure 13 actually form risers at opposite ends of the seat 11 for supporting the fore and aft adjusting mechanism for the seat 11. The arrangement is such that the seat elevating mechanism embodying the features of this invention may be readily installed in vehicles equipped with fore and aft adjusting means for the seat without altering the latter means.

What I claim as my invention is:

1. A seat supporting structure comprising a pair of laterally spaced base plates attachable to a floor, a pair of upstanding brackets rigid with each of said plates at longitudinally spaced points thereof, a frame structure adjustable relative to said base plates and including a pair of laterally spaced vertical plates respectively above and substantially at right angles to said base plates, said vertical plates being provided at their upper edges with lateral flanges for supporting a seat, a pair of tubes extending between and journaled in bearings on said vertical plates at longitudinally spaced points thereof, said tubes being offset relative to said brackets, arms terminally connected to said tubes and brackets, said arms being rigid with and projecting radially from said tubes and being pivotally connected to said brackets, brackets rigid with and projecting radially from said tubes, a link terminally connected to said radially projecting brackets, and means enabling said frame structure to be adjusted relative to said base plates including a bracket rigid with and projecting laterally from one of said vertical plates, an additional bracket rigid with and projecting radially from one of said tubes, a nut pivotally connected to said additional bracket, a rotatable screw threadedly engaging said nut and having a tubular part supported in said laterally projecting bracket, and an operating handle having a shank slidable within and operatively connected to the tubular part of said screw.

2. A seat supporting structure comprising a support attachable to a floor, upstanding brackets rigid with said support at longitudinally spaced points thereof, a frame structure adjustable relative to said support and including a pair of laterally spaced vertical plates above and substantially at right angles to said support, said vertical plates being provided at their upper edges with means for supporting a seat, a pair of tubes extending between and journaled in bearings on said vertical plates at longitudinally spaced points thereof, said tubes being offset relative to said brackets, arms terminally connected to said tubes and brackets, said arms being rigid with and projecting radially from said tubes and being pivotally connected to said brackets, brackets rigid with and projecting radially from said tubes, a link terminally connected to said radially projecting brackets and means enabling said frame structure to be adjusted relative to said support including a bracket rigid with and projecting laterally from one of said vertical plates, an additional bracket rigid with and projecting radially from one of said tubes, a nut pivotally connected to said additional bracket, a rotatable screw threadedly engaging said nut and having a tubular part supported in said laterally projecting bracket, and an operating handle having a shank slidable within and operatively connected to the tubular part of said screw.

3. A seat supporting structure comprising a pair of laterally spaced base plates attachable to a floor, a pair of upstanding brackets rigid with each of said plates at longitudinally spaced points thereof, a frame structure adjustable relative to said base plates and including a pair of laterally spaced vertical plates respectively above and substantially at right angles to said base plates, said vertical plates being provided at their upper edges with lateral flanges for supporting a seat, a pair of tubes extending between and journaled in bearings on said vertical plates at longitudinally spaced points thereof, said tubes being offset relative to said brackets, arms terminally connected to said tubes and brackets, said arms being rigid with and projecting radially from said tubes and being pivotally connected to said brackets, brackets rigid with and projecting radially from said tubes, a link terminally connected to said radially projecting brackets and means enabling said frame structure to be adjusted relative to said base plates including a bracket rigid with and projecting laterally from one of said vertical plates, an additional bracket rigid with and projecting radially from one of said tubes, a nut pivotally carried by said additional bracket, and rotatable means threadedly engaging said nut and supported in said laterally projecting bracket.

4. A seat supporting structure comprising a support attachable to a floor, upstanding brackets rigid with said support at longitudinally spaced points thereof, a frame structure adjustable relative to said support and including a pair of laterally spaced vertical plates above and substantially at right angles to said support, said vertical plates being provided at their upper edges with means for supporting a seat, a pair of tubes extending between and journaled in bearings on said vertical plates at longitudinally spaced points thereof, said tubes being offset relative to said brackets, arms terminally connected to said tubes and brackets, said arms being rigid with and projecting radially from said tubes and being pivotally connected to said brackets, brackets rigid with and projecting radially from said tubes, a link terminally connected to said radially projecting brackets and means enabling said frame structure to be adjusted relative to said support including a bracket rigid with and projecting laterally from one of said vertical plates, an additional bracket rigid with and projecting radially from one of said tubes, a nut pivotally carried by said additional bracket, and rotatable means threadedly engaging said nut and supported in said laterally projecting bracket.

References Cited in the file of this patent

UNITED STATES PATENTS

| | | |
|---|---|---|
| 521,127 | Putt | June 5, 1894 |
| 2,111,519 | Whedon et al. | Mar. 15, 1938 |
| 2,219,456 | Saunders et al. | Oct. 29, 1940 |
| 2,345,182 | Corber | Mar. 28, 1944 |
| 2,641,305 | Oishei | June 9, 1953 |